(12) United States Patent
Etter et al.

(10) Patent No.: US 10,487,632 B2
(45) Date of Patent: Nov. 26, 2019

(54) SYSTEMS AND METHODS FOR OPERATING A LINEAR MOTOR TO PREVENT IMPACTS WITH HARD STOPS

(71) Applicants: Nathan Etter, Tulsa, OK (US); David L. Garrett, Bartlesville, OK (US); Gary Williams, Broken Arrow, OK (US)

(72) Inventors: Nathan Etter, Tulsa, OK (US); David L. Garrett, Bartlesville, OK (US); Gary Williams, Broken Arrow, OK (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 15/975,926

(22) Filed: May 10, 2018

(65) Prior Publication Data

US 2018/0258744 A1    Sep. 13, 2018

Related U.S. Application Data

(62) Division of application No. 15/212,213, filed on Jul. 16, 2016, now Pat. No. 10,233,735.

(51) Int. Cl.

| F04B 47/06 | (2006.01) |
| E21B 43/12 | (2006.01) |
| F04B 19/22 | (2006.01) |
| F04B 49/02 | (2006.01) |
| H02K 11/215 | (2016.01) |

(Continued)

(52) U.S. Cl.
CPC .......... *E21B 43/128* (2013.01); *F04B 17/044* (2013.01); *F04B 19/22* (2013.01); *F04B 47/06* (2013.01); *F04B 49/02* (2013.01); *F04B 49/10* (2013.01); *F04B 49/12* (2013.01); *F04B 53/008* (2013.01); *H02K 11/215* (2016.01); *H02K 41/02* (2013.01); *H02P 3/18* (2013.01); *H02P 25/06* (2013.01); *E21B 47/0007* (2013.01); *F04B 17/03* (2013.01); *F04B 49/002* (2013.01);

(Continued)

(58) Field of Classification Search
CPC ................................ F04B 17/044; H02P 3/20
See application file for complete search history.

(56) References Cited

U.S. PATENT DOCUMENTS 4,334,180 A * 6/1982 Bramm ............... A61M 1/1053
310/37
4,687,054 A * 8/1987 Russell ................... E21B 43/00
166/105

(Continued)

*Primary Examiner* — Bryan M Lettman
*Assistant Examiner* — Timothy P Solak
(74) *Attorney, Agent, or Firm* — Sprinkle IP Law Group

(57) ABSTRACT

Systems and methods for operating a linear motor (e.g., for an ESP), where the motor's mover moves in a reciprocating motion within a bore of the stator. Hard stops are located at the ends of the bore. The motor has a first set of sensors in the stator positioned proximate to the bore. When the mover moves in the bore, the sensors produce corresponding output signals, except when the mover is in a position near, but not in contact with a hard stop. While the sensors produce output signals, the motor is driven in a first direction toward the hard stop. When the sensors stop producing the output signals, the mover has reached the first position, and the motor is controlled to reverse the direction of the mover.

8 Claims, 6 Drawing Sheets

(51) Int. Cl.
*H02K 41/02* (2006.01)
*H02P 25/06* (2016.01)
*F04B 49/12* (2006.01)
*F04B 17/04* (2006.01)
*F04B 49/10* (2006.01)
*F04B 53/00* (2006.01)
*H02P 3/18* (2006.01)
*E21B 47/00* (2012.01)
*F04B 17/03* (2006.01)
*F04B 49/00* (2006.01)
*H02K 33/16* (2006.01)
*H02K 41/03* (2006.01)
*H02P 3/20* (2006.01)

(52) U.S. Cl.
CPC .......... *H02K 33/16* (2013.01); *H02K 41/031* (2013.01); *H02P 3/20* (2013.01)

(56) References Cited

U.S. PATENT DOCUMENTS

| | | | | |
|---|---|---|---|---|
| 5,831,353 | A * | 11/1998 | Bolding | F04B 17/046 310/12.15 |
| 7,218,017 | B1 * | 5/2007 | Chitayat | H02K 21/14 310/12.19 |
| 2002/0180397 | A1 * | 12/2002 | Henley | A61B 6/0457 318/687 |
| 2009/0101716 | A1 * | 4/2009 | Mani | G06K 7/0008 235/441 |
| 2012/0098469 | A1 * | 4/2012 | Takeuchi | H02K 41/031 318/135 |

* cited by examiner

SYSTEMS AND METHODS FOR OPERATING A LINEAR MOTOR TO PREVENT IMPACTS WITH HARD STOPS

CROSS-REFERENCE TO RELATED APPLICATIONS

This application is a divisional application of U.S. patent application Ser. No. 15/212,213, filed Jul. 16, 2016 by Etter et al., now U.S. Pat. No. 10,233,735, which is incorporated by reference as if set forth herein in its entirety.

BACKGROUND

Field of the Invention

The invention relates generally to downhole tools for use in wells, and more particularly to means for determining whether the mover of a downhole linear motor has reached a position near the end of a stroke, and reversing the direction of the mover before the mover hits a hard stop at the end of the stroke.

Related Art

In the production of oil from wells, it is often necessary to use an artificial lift system to maintain the flow of oil. The artificial lift system commonly includes an electric submersible pump (ESP) that is positioned downhole in a producing region of the well. The ESP has a motor that receives electrical signals from equipment at the surface of the well. The received signals run the motor, which in turn drives a pump to lift the oil out of the well.

ESP motors commonly use rotary designs in which a rotor is coaxially positioned within a stator and rotates within the stator. The shaft of the rotor is coupled to a pump, and drives a shaft of the pump to turn impellers within the body of the pump. The impellers force the oil through the pump and out of the well. While rotary motors are typically used to enhance oil recovery, it is also possible to use linear motors for the same purpose. Instead of a rotor, the linear motor has a mover that moves in a linear, reciprocating motion. The mover drives a plunger-type pump to force oil out of the well, thus lifting oil and/or other fluids out of the well.

Conventionally, a linear motor is controlled so that the mover is driven in one direction until it hits a hard stop at the end of the stroke. The hard stop is a physical stop that prevents the mover from moving past a certain point. After the mover hits the hard stop, the motor is controlled to drive the mover in the opposite direction. The mover is driven in this direction until it hits a hard stop at the opposite end of the stroke. After the mover hits this hard stop, the motor is again reversed, driving the mover in the first direction. Because the mover is driven back and forth into the hard stops, this is sometimes referred to as a "bang-bang" motor.

Even though the motor is designed with the intent that the mover hit the hard stops at the ends of the motor's stroke, the collisions of the mover with the hard stops nevertheless jar the motor and cause vibration that may adversely affect various components of the motor. The impacts may loosen or damage these components, and may therefore reduce the reliability of the motor or shorten its useful life. It would therefore be desirable to reduce or eliminate the impact of the mover with the hard stops.

SUMMARY OF THE INVENTION

This disclosure is directed to systems and methods for operating a linear motor such as may be used in an ESP, where sensors are positioned in the motor so that the absence of signals from the sensors indicates that the motor's mover is approaching the end of its stroke, and where in response to detecting this position, the direction of the mover is reversed so that the mover is not driven into a hard stop at the end of the stroke.

One embodiment comprises an ESP system that includes a reciprocating pump, a linear motor and an electric drive. The electric drive is coupled to the motor by a power cable and configured to produce power that drives the motor. The motor is coupled to the pump and is configured to drive the pump. The motor has a stator and a mover, where the mover is positioned within the bore of the stator and moves in a reciprocating motion within the bore. The stroke of the mover within the bore has a first end and a second end. A first hard stop prevents the mover from moving past the first end of the stroke and a second hard stop prevents the mover from moving past the second end of the stroke. The motor has a first set of sensors in the stator positioned proximate to the bore. When the mover moves in the bore, the sensors produce corresponding output signals, except when the mover is in a first position which is proximate to the second hard stop, but is not yet in contact with the second hard stop. The electric drive includes a controller that controls the output of the drive. The controller causes the drive to produce an output that drives the motor in a reciprocating motion. While the sensors produce output signals, a current phase order (and mover direction) is maintained. When the sensors do not produce output signals, the mover has reached the first position, and the controller reverses the phase order of the power produced by the electric drive before the mover hits the hard stop, which reverses the direction of movement of the mover.

In one embodiment, the motor only has a first set of sensors at a first end of the bore, and therefore only prevents the mover from hitting the hard stop at one end of the bore. In another embodiment, the motor has sets of sensors at both ends of the bore, and therefore prevents the mover from hitting the hard stops at both ends of the bore. The sensors in one embodiment are Hall-effect sensors that sense motion of the permanent magnets in the mover. The outputs of these sensors may be processed by circuitry in the motor that produces a composite signal from the individual sensor signals. The combining circuitry may, for example, XOR (perform an exclusive OR operation on) the sensor signals and provide the resulting composite signal to the electric drive's controller.

One alternative embodiment is a linear motor. This motor has a stator and a mover, where the mover is positioned within the bore of the stator. The mover moves between the first and second ends of the mover's stroke in a reciprocating motion. A first hard stop prevents the mover from moving past the first end of the stroke and a second hard stop prevents the mover from moving past the second end of the stroke. The motor has a first set of sensors positioned in the stator proximate to the bore. When the mover moves in the bore, the first set of sensors produce corresponding output signals, except when the mover is in a first position which is proximate to the second hard stop, but not yet in contact with the hard stop. The motor may also include a second set of sensors positioned proximate in the stator to the bore, but near the end opposite the first set of sensors. When the mover moves in the bore, the second set of sensors produce corresponding output signals, except when the mover is in a second position which is proximate to the first hard stop, but not in contact with the hard stop.

In one embodiment, the motor provides output from the first set of sensors to an electric drive system and receives power from the electric drive system. While the electric drive system receives output signals from the first set of sensors indicating that the mover is not in the first position which is proximate to the second hard stop, the electric drive system continues to provide power to the motor having a first phase order. When the electric drive system does not receive these output signals from the first set of sensors, it provides the motor with power having a second phase order which is the reverse of the first phase order. This reverses the direction of movement of the mover and prevents the mover from being driven into the hard stop. The sensors may, for example, be Hall-effect sensors. The sensors may be positioned so that when the mover is not in the first position, at least one of the first set of sensors overlaps with at least one of the mover's permanent magnets, and when the mover is in the first position, none of the first set of sensors overlaps with any of the permanent magnets. The motor may include combining circuitry that receives the output signals from the first set of sensors and produces a composite signal from them. The combining circuitry may, for example, XOR the output signals from the first set of sensors and thereby produce the composite signal.

Another embodiment is a method for controlling the linear motor of an ESP system. The method includes providing power to a linear motor of an ESP system, where the power has a first phase order that drives the mover of the motor in a first direction within the bore of the stator in the motor. A first set of sensors in the stator is monitored, where the sensors produce corresponding output signals when the mover is moving, except when the mover is in a first position which is proximate to, but not in contact with a first hard stop in the bore of the stator. While the first set of sensors output signals indicating movement of the mover, production of power having the first phase order is continued. When the first set of sensors discontinue outputting signals indicating movement of the mover, power having a second phase order is produced prior to the mover hitting the first hard stop, where the second phase order is the reverse of the first phase order. The power having the second phase order therefore drives the mover in a second direction which is opposite the first direction. The method may also include, while producing power having the second phase order, monitoring a second set of sensors in the stator which produce corresponding output signals when the mover is moving, except when the mover is in a second position which is proximate to, but not in contact with a second hard stop in the bore of the stator. While the second set of sensors output signals indicating movement of the mover, production of power having the second phase order is continued. When the second set of sensors discontinue outputting signals indicating movement of the mover, power having the first phase order is produced prior to the mover hitting the second hard stop, thereby driving the mover in the first direction.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
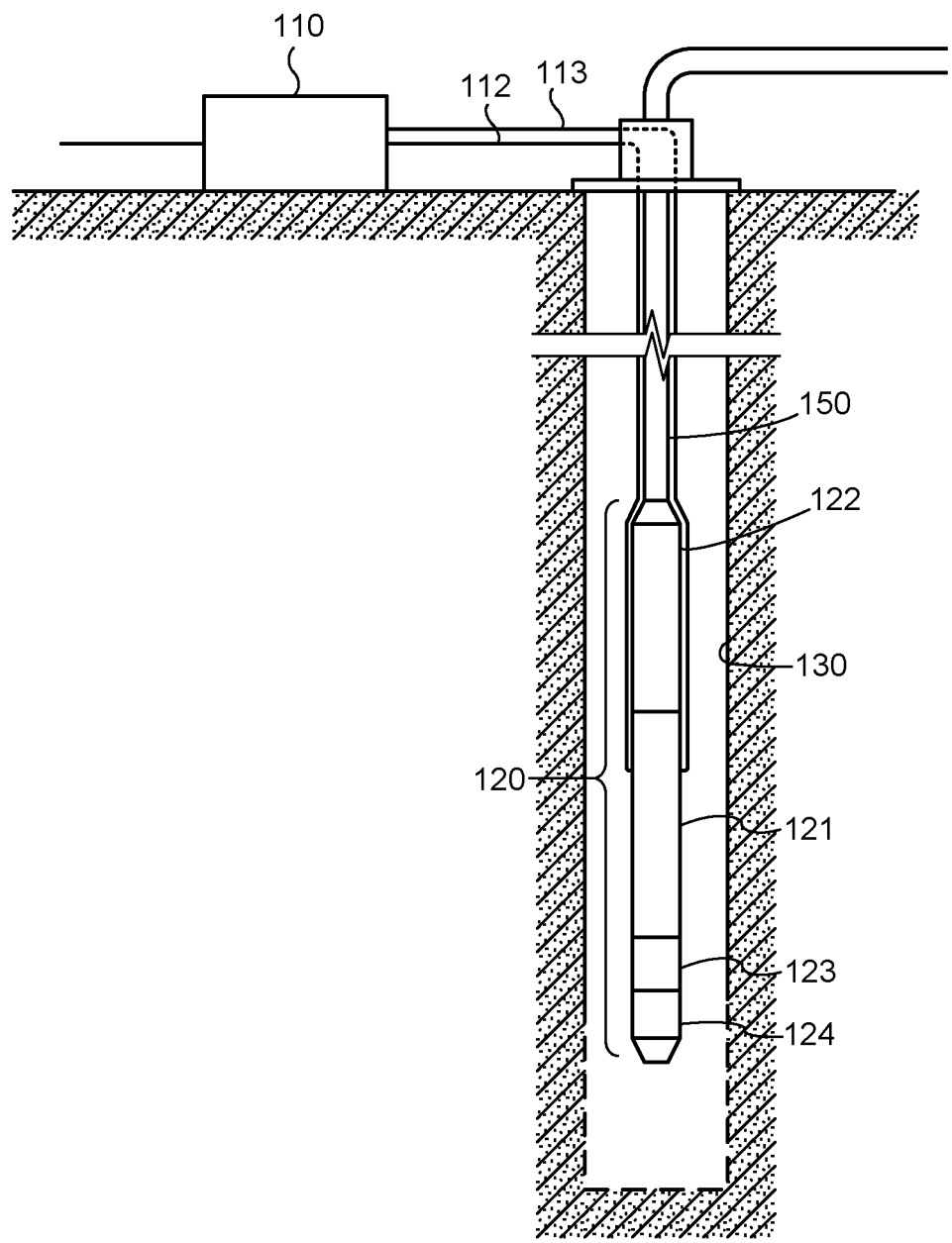
FIG. 1 is a diagram illustrating an exemplary pump system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for determining when the mover of a linear motor reaches the end of a stroke. In one embodiment, the linear motor is a component of an ESP. The linear motor receives input power from a drive system and drives a pump to lift oil out of a well in which the ESP is installed. Hall sensors are installed in the motor to sense movement of the mover within the stator. The drive system includes a controller that monitors signals from the Hall sensors, as well as several other parameters associated with the motor, and uses this information to determine when the mover has reached a point near the end of a stroke. When this point has been reached, the controller reverses the phase order of the power provided to the motor and drives the mover in the opposite direction. The direction of the mover is reversed prior to the mover hitting a hard stop at the end of the stroke. The elimination of the impact between the mover and hard stop reduces the risk of damage from these impacts and increases the reliability and useful life of the motor.

Referring to FIG. 1, a diagram illustrating an exemplary pump system in accordance with one embodiment of the present invention is shown. A wellbore 130 is drilled into an oil-bearing geological structure and is cased. The casing within wellbore 130 is perforated in a producing region of the well to allow oil to flow from the formation into the well. Pump system 120 is positioned in the producing region of the well. Pump system 120 is coupled to production tubing 150, through which the system pumps oil out of the well. A control system 110 is positioned at the surface of the well. Control system 110 is coupled to pump system 120 by power cable 112 and a set of electrical data lines 113 that may carry various types of sensed data and control information between the downhole pump system and the surface control equipment. Power cable 112 and electrical lines 113 run down the wellbore along tubing string 150.

Pump 120 includes an electric motor section 121 and a pump section 122. In this embodiment, an expansion chamber 123 and a gauge package 124 are included in the system. (Pump system 120 may include various other components which will not be described in detail here because they are well known in the art and are not important to a discussion of the invention.) Motor section 121 receives power from control system 110 and drives pump section 122, which pumps the oil through the production tubing and out of the well.

In this embodiment, motor section 121 is a linear electric motor. Control system 110 receives AC (alternating current) input power from an external source such as a generator (not shown in the figure), rectifies the AC input power and then converts the DC (direct current) power to produce three-phase AC output power which is suitable to drive the linear motor. The output power generated by control system 110 is dependent in part upon the position of the mover within the stator of the linear motor. Position sensors in the motor sense the position of the mover and communicate this information via electrical lines 113 to control system 110 so that the mover will be driven in the proper direction (as will be discussed in more detail below). The output power generated by control system 110 is provided to pump system 120 via power cable 112.

Figure 2A:
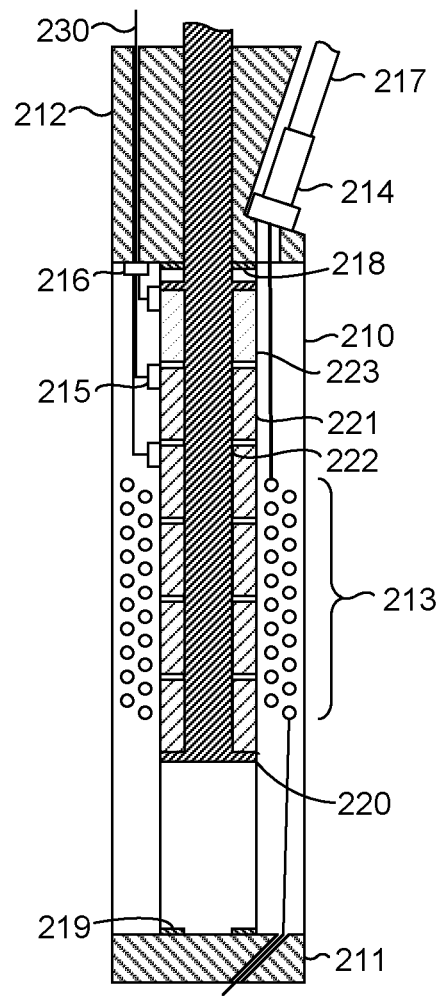
FIGS. 2A and 2B are diagrams illustrating the structure of an exemplary linear motor in accordance with one embodiment which would be suitable for use in the pump system of FIG. 1.

Referring to FIG. 2A, a diagram illustrating an exemplary linear motor which would be suitable for use in the pump system of FIG. 1 is shown. The linear motor has a cylindrical stator 210 which has a bore in its center. A base 211 is connected to the lower end of stator 210 to enclose the lower end of the bore, and a head 212 is connected to the upper end of the stator. Motor head 212 has an aperture therethrough to allow the shaft 222 of the mover 220 to extend to the pump. In this embodiment, the pump is configured to both draw fluid into the pump and expel the fluid from the pump on the downstroke. The upstroke simply returns the mover to a position from which it can begin another downstroke. In other words, the downstroke is the power stroke and the upstroke is the return stroke. In alternative embodiments, the pump may be configured so that the upstroke is the power stroke and the downstroke is the return stroke, or so that both the upstroke and the downstroke are power strokes (i.e., the pump expels fluid on both strokes).

Stator 210 has a set of windings 213 of magnet wire. Windings 213 include multiple separate coils of wire, forming multiple poles within the stator. The ends of the windings are coupled (e.g., via a pothead connector 214) to the conductors of the power cable 217. Although the power cable has separate conductors that carry the three phase power to the motor, the conductors are not depicted separately in the figure for purposes of simplicity and clarity. Similarly, the coils of magnet wire are not separately depicted. The coils may have various different configurations, but are collectively represented as component 213 in the figure.

The windings are alternately energized by the signals received through the power cable to generate magnetic fields within the stator. These magnetic fields interact with permanent magnets 221 on the shaft 222 of mover 220, causing mover 220 to move up and down within the motor. The waveform of the signal provided by the drive via the power cable (in this case a three-phase signal) is controlled to drive mover 220 in a reciprocating motion within the bore of stator 210. Stator 210 incorporates a set of Hall-effect sensors (e.g., 215) to monitor the movement of mover 220 within stator 210. As magnets 221 of the mover pass the Hall-effect sensors, their magnetic fields cause signals to be generated by the sensors. The outputs of Hall-effect sensors 215 may be transmitted to a controller of a drive system for the motor (see FIG. 3 below) as distinct signals, or they may be combined to form one or more composite signals by circuitry 216. In one embodiment, the composite signal is produced by XOR'ing the signals of the different Hall-effect sensors to produce a composite signal which indicates transitions in the signals produced by each of the sensors, but it does not indicate which specific sensor is associated with each transition. The composite signal is transmitted to the controller in this embodiment via signal line 230. The controller monitors the transitions in the composite signal and uses this information to produce the AC output waveform that drives the motor.

Mover 220 moves in a reciprocating manner within the bore of stator 210. Mover 220 can move between an upper end of its stroke at which the mover contacts an upper hard stop 218, and a lower end of its stroke at which the mover contacts a lower hard stop 219. Although mover 220 can move into contact with hard stops 218 and 219, the repeated impact of the mover with the hard stops can damage and/or decrease the reliability and lifetime of the motor. Consequently, the motor is configured so that the mover is driven through each stroke until it almost reaches the hard stop, but is reversed before coming into contact with the hard stops. Alternatively, the mover may be driven so that its speed is substantially reduced before making contact with the hard stops. This reduces the impact with the hard stops and reduces the damage that would otherwise be caused by relying on the hard stops to halt the movement of the mover.

Figure 2B:
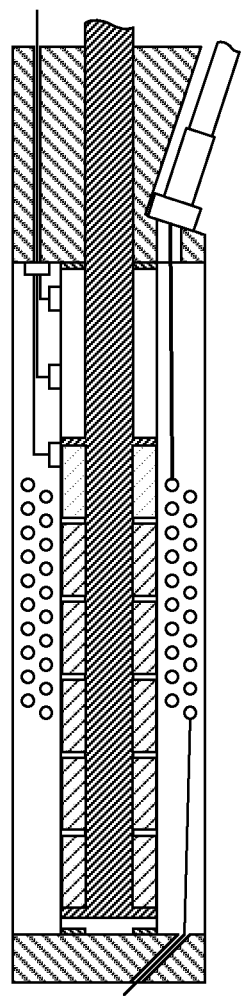

In the embodiment of FIG. 2A, the Hall-effect sensors are positioned near the upper end of the stator, so that when the mover is near the top of the stroke, one or more of the magnets on the mover are proximate to the Hall-effect sensors. As mover 220 moves downward, the magnets pass the Hall-effect sensors, causing signal transitions to be produced at the outputs of the sensors and at the output of circuitry 216. When mover 220 nears the bottom end of its stroke as shown in FIG. 2B, none of the magnets remain proximate to the Hall-effect sensors, so the sensors no longer produce any signal transitions at their outputs. Consequently, there are no transitions in the composite signal output by circuitry 216. This is detected by the controller, which interprets the absence of signal transitions as an indication that the mover has reached the end of its stroke. Accordingly, the controller produces an output waveform that drives the mover in the opposite direction (upward in this embodiment). The controller does this before the mover reaches the hard stop at the bottom of the stator, so the mover does not hit the hard stop and does not suffer the damage that normally results from this impact.

Conventionally, sensors such as Hall-effect sensors 215 are positioned so that one or more of the sensors is proximate to one or more of permanent magnets 221, no matter where mover 220 is positioned. Consequently, the absence of signals indicates that the mover has stopped and, at the end of the stroke, this is most likely a result of the mover having already impacted the hard stop. In fact, conventional linear motors are often intentionally driven from hard stop to stop and are damaged by these impacts. This conventional design may be modified so that the end magnet is replaced with a spacer (e.g., 223). This causes the Hall-effect sensor transitions to be discontinued before the mover reaches the hard stop at the end of the stroke and allows the mover to be reversed before hitting the hard stop.

Figure 3:
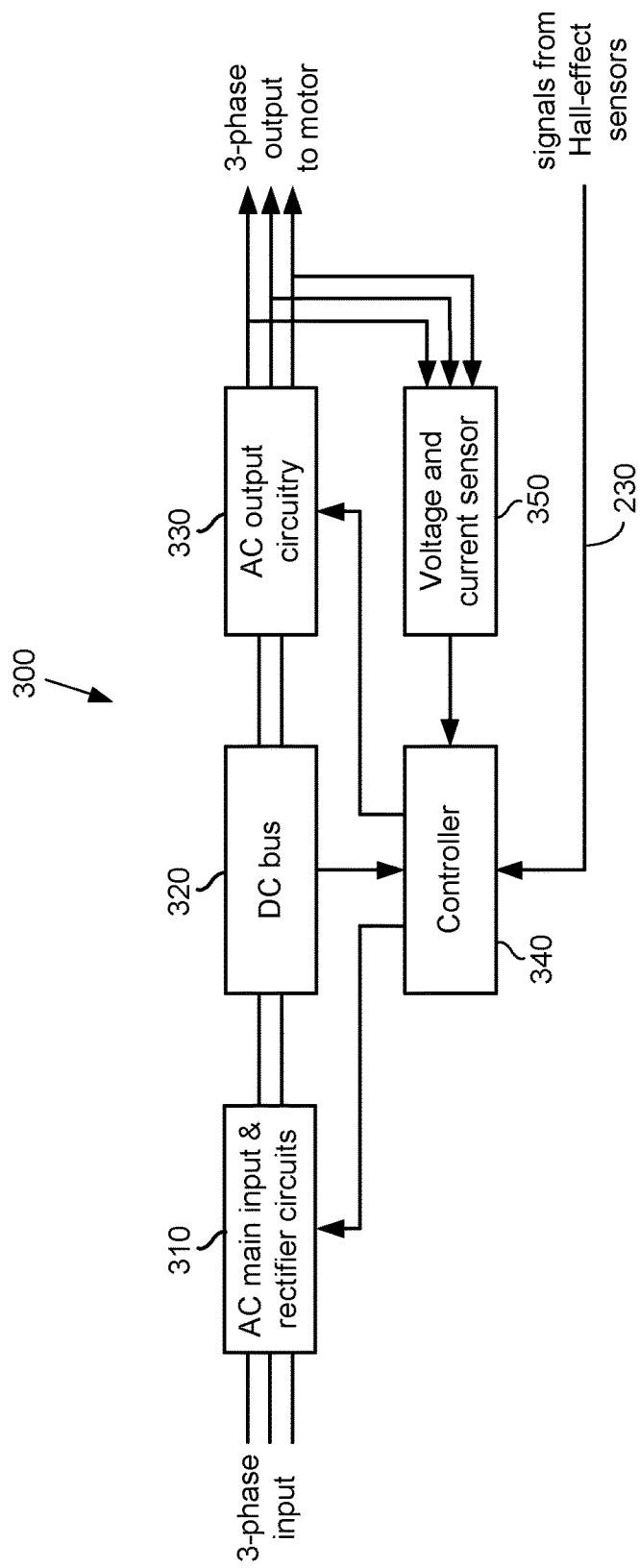
FIG. 3 is a functional block diagram illustrating the structure of an exemplary electric drive for a linear motor in accordance with one embodiment.

As noted above, the motor is controlled by an electric drive that provides the AC waveforms that power the motor. Referring to FIG. 3, a functional block diagram illustrating the structure of an exemplary electric drive for a linear motor is shown. The electric drive 110 incorporates a control system for the linear motor. The drive receives AC input power from an external source and generates three-phase output power that is provided to the linear motor to run the motor. The drive also receives position information from the Hall-effect sensors in the linear motor and uses this information when generating the three-phase output power for the motor. It should be noted that the system of FIG. 3 is exemplary, and alternative embodiments may employ other components or technologies to produce an output signal to drive the linear motor.

As depicted in FIG. 3, drive system 300 has input and rectifier circuitry 310 that receives AC input power from the external power source. Circuitry 310 converts the received AC power to DC power at a predetermined voltage level and stores this power within the DC link 320. The DC link in this embodiment then provides DC power to the output circuitry 330 that includes a set of IGBT (insulated gate bipolar transistor) switches. The switches of output circuitry 330 are controlled by motor controller 340 to produce an AC output signal, such as a six-step or PWM waveform. Output circuitry 330 may include filters to modify the generated waveform before it is provided to the motor. For instance, it may be necessary to perform filtering on a PWM waveform in order to prevent damage to the power cable or motor. The signal produced by output circuitry 330 is transmitted to the downhole linear motor via a power cable. As noted above, this system is exemplary, and alternative embodiments may use other technologies (e.g., a matrix converter) to generate the desired output signal from the AC input power.

The power produced by output circuitry 330 is monitored by voltage and current sensors 350. Sensors 350 provide signals to motor controller 340 indicating the voltage output by output circuitry 330, and the current drawn by the downhole linear motor. Motor controller 340 also receives position information from the downhole linear motor. In one embodiment, this position information consists of the signals generated by the Hall-effect sensors as described above in connection with FIGS. 2A-2B. Motor controller 340 can use the received position information to determine the position and speed of the mover within the linear motor. Based upon the position and speed of the mover, as well as various other information, controller 340 controls output circuitry 330 to generate an output signal to drive the motor.

The downhole linear motor is an electrically commutated motor. In other words, the electrical commutation or voltage modulation is accomplished electrically via the surface drive unit. In normal operation (while the system is operating to pump fluid from the well), the motor is electrically commutated based on the position of the mover. More specifically, in this embodiment, the motor is commutated based on the signals generated by the Hall-effect sensors. The output signals produced by the drive system are generated to slightly lead the mover, regardless of the mover's speed, rather than being generated at a specific frequency. The speed of the motor is controlled by varying the voltage of the drive signal provided to the motor, and not by directly controlling the frequency of the drive signal.

As noted above, it is desirable to know the position of the mover within the motor, as well as the speed and direction of the mover. For instance, if it is known that the mover is in the middle of the power stroke (downward in one embodiment), the controller can generate an output with the proper phasing to drive the mover through the rest of the stroke. (While it may be possible to drive the motor with an output that does not have the desired phasing, the motor generally does not operate as efficiently as when the proper phasing is used). Improper phasing may also result in increased power losses and a significant drop in the overall system efficiency. At the end of the stroke, the controller reverses the phasing of the power to the motor and thereby drives the mover in the opposite direction.

Figure 4:
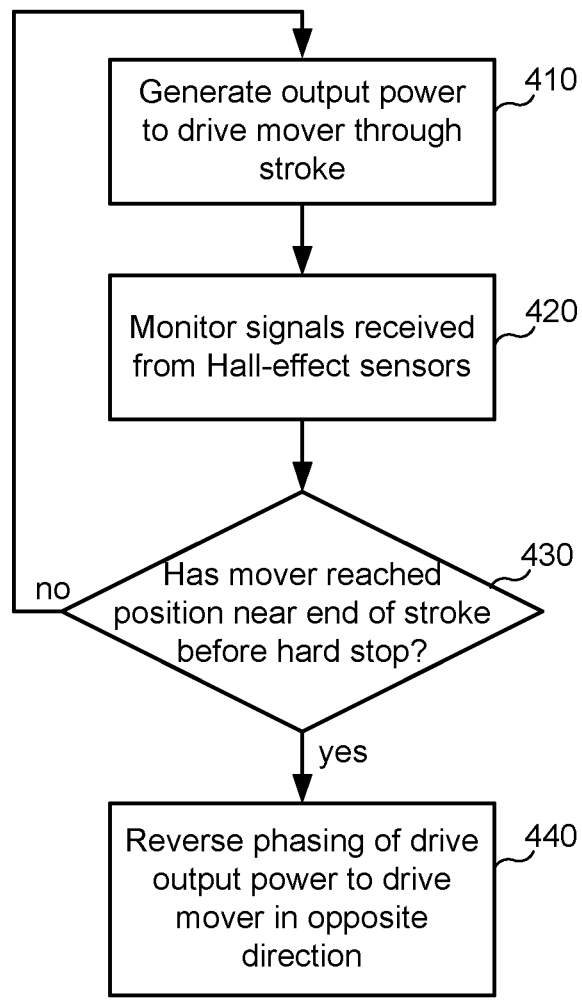
FIG. 4 is a flow diagram illustrating an exemplary method for controlling a linear motor in accordance with one embodiment.

An exemplary method for controlling a linear motor is illustrated in the flow diagram of FIG. 4. In this embodiment, the controller causes the drive system to generate a power output that drives the motor's mover in a first direction (410). The composite signal from the Hall-effect sensors is monitored to identify transitions in the signal (420). As explained above, these transitions indicate movement of the mover past the Hall-effect sensors in the stator. The controller commutates the motor based on the transitions. The controller also monitors the composite signal to determine whether the mover has reached a position that is near the end of the stroke, but before the mover has come into contact with the hard stop (430). This may be done, for example, by monitoring the time intervals between the transitions in the composite signal and determining whether the elapsed time since the last transition exceeds a threshold value. If the elapsed time exceeds the threshold, this indicates that the mover has reached the position near the end of the stroke at which the mover's magnets have passed all of the Hall-effect sensors. When the controller detects that the mover has reached a position near the end of the stroke, it reverses the phase order of the electric drive's output power (440). This causes the mover to stop and then move in the opposite direction without hitting the hard stop at the end of the stroke. If the mover has not yet reached this position, the controller causes the drive system to continue to drive the mover in the current direction (410).

The embodiment described above in connection with FIGS. 2A and 2B uses a set of Hall-effect sensors that are positioned at the upper end of the stator. When the mover is at the top of the stroke as shown in FIG. 2A, some of the mover's permanent magnets are within range of the Hall-effect sensors, so the sensors produce output signals. When the mover is at the bottom of the stroke as shown in FIG. 2B, none of the mover's magnets are within range of the Hall-effect sensors, so the sensors do not produce output signal transitions. It can be determined when the mover approaches the bottom end of its stroke by detecting the absence of signal transitions from the Hall-effect sensors as in FIG. 2B. In this embodiment, the mover's approach to the lower end of the stroke is detected, but the mover's approach to the upper end of the stroke is not. This configuration may be sufficient if impacts of the mover with the upper hard stop are not as damaging as impacts with the lower hard stop. For example, if the motor is used with a reciprocating pump for which the downward stroke is the power stroke and the upward stroke is the return stroke, the motor may potentially be driven into the lower hard stop with more force than the upper hard stop. If it is desired to detect the mover's approach to both the upper and lower ends of the stroke and to prevent impacts with both the upper and lower hard stops, configurations such as the ones illustrated in FIGS. 5 and 6 may be used.

Figure 5:
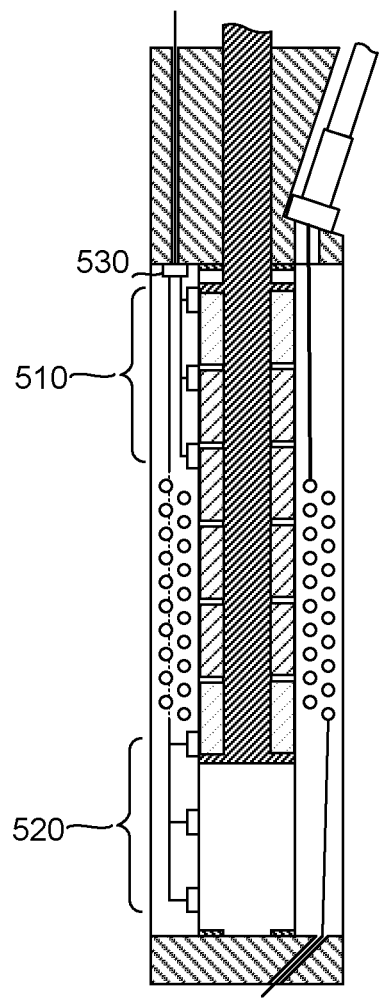
FIG. 5 is a diagram illustrating the structure of a linear motor in accordance with an alternative embodiment in which sensors are positioned at both ends of the stator.

An alternative embodiment of the motor may be configured to prevent impacts with both the lower and upper hard stops. An example of this is illustrated in FIG. 5. The general structure of this embodiment is similar to the embodiment of FIGS. 2A and 2B, but it includes both an upper set 510 of Hall-effect sensors and a lower set 520 of these sensors. Each set of sensors is coupled to circuitry 530 that generates a corresponding composite signal as described above. A different composite signal is produced for each set of Hall-effect sensors. The composite signals are forwarded to the controller in the electric drive, and the controller monitors the signals to determine whether there is an absence of transitions in either of the signals. If this is detected in the signal for the upper Hall-effect sensors, it indicates that the mover is approaching the lower end of the stroke, so the controller reverses the phase order of the drive's output to drive the mover upward. If, on the other hand, an absence of transitions is detected in the signal for the lower Hall-effect sensors, it indicates that the mover is approaching the upper end of the stroke, so the controller reverses the phase order of the drive's output to drive the mover downward.

Figure 6A:
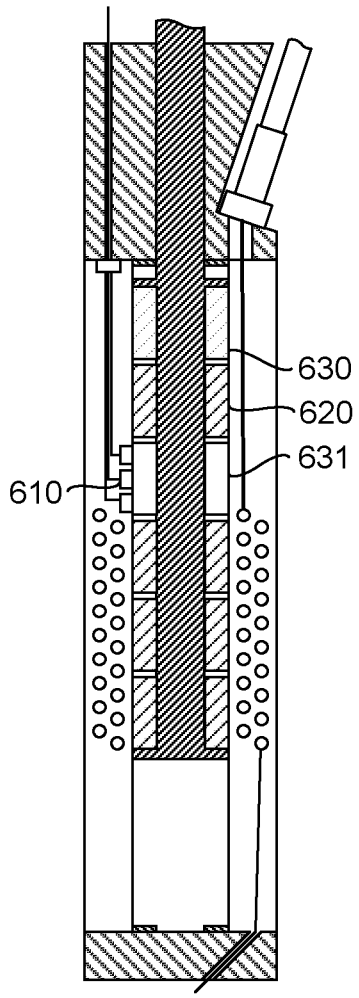
FIGS. 6A and 6B are diagrams illustrating the structure of a linear motor in accordance with another alternative embodiment in which sensors are positioned at one end of the stator, but both ends of the mover's stroke can be detected.
Figure 6B:
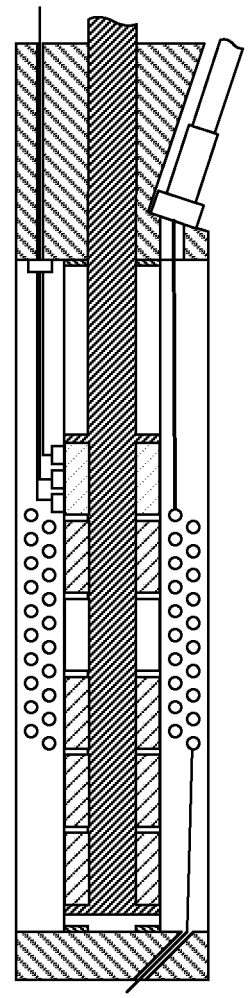

Another alternative embodiment of the motor that prevents impacts with both the lower and upper hard stops is illustrated in FIGS. 6A and 6B. The general structure of this embodiment is similar to the embodiment of FIGS. 2A and 2B, but it has a section of magnets that are removed (and replaced by a spacer 631) from an area of the mover corresponding to the location of the Hall-effect sensors (e.g., 610) when the mover is near the upper hard stop (see FIG. 6A). Additionally, an end section of magnets is replaced by a spacer 630 which is proximate to the Hall-effect sensors when the mover is near the lower hard stop (see FIG. 6B). When the mover is near either the upper hard stop or lower hard stop, none of the mover's magnets will be within range of the Hall-effect sensors, so the sensors will not produce any output signal transitions. Between these positions, the magnets (620) between spacers 630 and 631 will be within range of the Hall-effect sensors, which will then produce signal transitions.

In response to detecting the absence of signal transitions, the controller can reverse the commutation sequence and thereby reverse the direction of the mover. In other words, if the controller is driving the motor in the commutation sequence corresponding to the upward stroke, the absence of signal transitions indicates that the mover is approaching the upper end of the stroke, so the controller reverses the phase order of the drive's output to drive the mover downward. If an absence of transitions is detected when the controller is driving the motor in the commutation sequence corresponding to the downward stroke, it indicates that the mover is approaching the lower end of the stroke, so the controller reverses the phase order of the drive's output to drive the mover upward.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. An apparatus comprising:
   a linear motor having a stator and a mover, wherein the mover is positioned within a bore of the stator, wherein the mover moves in a reciprocating motion within the bore between a first end of a stroke and a second end of the stroke, wherein a first hard stop prevents the mover from moving past the first end of the stroke and a second hard stop prevents the mover from moving past the second end of the stroke; and
   a first set of sensors in the stator positioned proximate to the bore, wherein when the mover moves in the bore, the first set of sensors produce corresponding output signals except when the mover is in a position proximate to but not in contact with one of the hard stops;
   wherein the first set of sensors produce corresponding output signals except when the mover is in either a first position proximate to but not in contact with the second hard stop, or a second position proximate to but not in contact with the first hard stop;
   wherein while the first set of sensors produce the corresponding output signals indicating that the mover is not in the first position and not in the second position, the motor receives power having a current phase order, and wherein in response to determining that the first set of sensors is not producing the corresponding output signals, the current phase order of the power is reversed, thereby reversing a direction of movement of the mover within the bore of the stator.

2. The apparatus of claim 1, wherein the motor provides output from the first set of sensors to an electric drive system and receives power from the electric drive system, wherein while the electric drive system receives output signals from the first set of sensors indicating that the mover is not in the first position proximate to the second hard stop, the electric drive system provides power to the motor having a first phase order, and wherein when the electric drive system does not receive output signals from the first set of sensors, the electric drive system provides power to the motor having a second phase order which is the reverse of the first phase order.

3. The apparatus of claim 1, further comprising combining circuitry that receives the output signals from the first set of sensors and produces a composite signal from the output signals of the first set of sensors.

4. The apparatus of claim 3, wherein the combining circuitry performs an exclusive OR operation on (XOR's) the output signals from the first set of sensors and thereby produces the composite signal.

5. An apparatus comprising:
   a linear motor having a stator and a mover, wherein the mover is positioned within a bore of the stator, wherein the mover moves in a reciprocating motion within the bore between a first end of a stroke and a second end of the stroke, wherein a first hard stop prevents the mover from moving past the first end of the stroke and a second hard stop prevents the mover from moving past the second end of the stroke; and a first set of sensors in the stator positioned proximate to the bore, wherein when the mover moves in the bore, the first set of sensors produce corresponding output signals except when the mover is in a position proximate to but not in contact with one of the hard stops;

wherein the first set of sensors produce corresponding output signals except when the mover is in either a first position proximate to but not in contact with the second hard stop, or a second position proximate to but not in contact with the first hard stop, wherein the motor provides output from the first set of sensors to an electric drive system and receives power from the electric drive system, wherein while the electric drive system receives output signals from the first set of sensors indicating that the mover is not in the first position proximate to the second hard stop, the electric drive system provides power to the motor having a first phase order, and wherein when the electric drive system does not receive output signals from the first set of sensors, the electric drive system provides power to the motor having a second phase order which is the reverse of the first phase order, wherein the first set of sensors comprise Hall-effect sensors, and wherein the mover comprises one or more permanent magnets, wherein when the mover is not in the first position, at least one of the first set of sensors overlaps with at least one of the one or more permanent magnets, and wherein when the mover is in the first position, none of the first set of sensors overlaps with any of the one or more permanent magnets.

6. An electric submersible pump (ESP) system comprising:
   a reciprocating pump;
   a linear motor coupled to the pump and configured to drive the pump; and
   an electric drive coupled to the motor by a power cable and configured to produce power that drives the motor;
   wherein the motor includes a stator and a mover, wherein the mover is positioned within a bore of the stator, wherein the mover moves in a reciprocating motion within the bore between a first end of a stroke and a second end of the stroke, wherein a first hard stop prevents the mover from moving past the first end of the stroke and a second hard stop prevents the mover from moving past the second end of the stroke;
   wherein the motor includes a first set of sensors in the stator positioned proximate to the bore, wherein when the mover moves in the bore, the first set of sensors produce corresponding output signals except when the mover is in either a first position proximate to but not in contact with the second hard stop, or a second position proximate to but not in contact with the first hard stop;
   wherein the electric drive includes a controller, wherein when the motor is operating and the first set of sensors produce output signals, the electric drive provides power to the motor having a current phase order, and wherein in response to determining that the first set of sensors are not producing output signals, the controller reverses the current phase order of the power provided to the motor and thereby reverses a direction of movement of the mover within the bore of the stator.

7. The ESP system of claim 6, wherein the first set of sensors comprise Hall-effect sensors, and wherein the motor includes combining circuitry that receives the output signals from the first set of sensors and produces a composite signal from the output signals of the first set of sensors.

8. The ESP system of claim 7, wherein the combining circuitry performs an exclusive OR operation on (XOR's) the output signals from the first set of sensors and thereby produces the composite signal.

* * * * *